United States Patent [19]

Patterson

[11] 4,422,528

[45] Dec. 27, 1983

[54] AERIAL BASKET STRUCTURE FOR LINEMEN AND METHOD FOR UTILIZING SAME

[75] Inventor: Donald D. Patterson, Lake Oswego, Oreg.

[73] Assignee: Columbia Helicopters, Inc., Portland, Oreg.

[21] Appl. No.: 253,901

[22] Filed: Apr. 13, 1981

[51] Int. Cl.³ .............................................. E04G 3/10
[52] U.S. Cl. .................................... 182/145; 182/150; 182/63
[58] Field of Search ............ 254/134.3 R; 244/137 R, 244/137 P; 182/145, 142, 150, 2, 63

[56] References Cited

U.S. PATENT DOCUMENTS

| | | | |
|---|---|---|---|
| 2,009,474 | 7/1935 | Castelli | 182/134 |
| 2,433,859 | 1/1948 | McCormick | 182/142 |
| 3,042,385 | 7/1962 | Smith | 254/134.3 R |
| 3,146,853 | 9/1964 | Eckels | 182/2 |
| 3,176,795 | 4/1965 | Taylor | 182/82 |
| 3,863,736 | 2/1975 | McWilliams | 182/150 |

FOREIGN PATENT DOCUMENTS 98746 12/1924 Austria ............................ 244/137 R

*Primary Examiner*—Reinaldo P. Machado
*Assistant Examiner*—Alvin Chin-Shue
*Attorney, Agent, or Firm*—James D. Givnan, Jr.

[57] ABSTRACT

A basket structure for supporting linemen performing maintenance work on tower supported lines and method of performing same is disclosed. The basket is embodied within an enclosure having corner members in attachment to sling lines of a helicopter. An inclined appendage on each corner post engages a segment of the tower supported line during elevation of the enclosure by the helicopter to temporarily secure the enclosure in place on the line to permit maintenance task performance. The inclined appendages include a resilient covering to enhance line or static wire engagement. Lugs at the corner post upper ends attach the sling lines in an offset manner to permit unobstructed vertical movement of the enclosure past the line preliminary to upward seating of a pair of appendages against the line.

2 Claims, 4 Drawing Figures

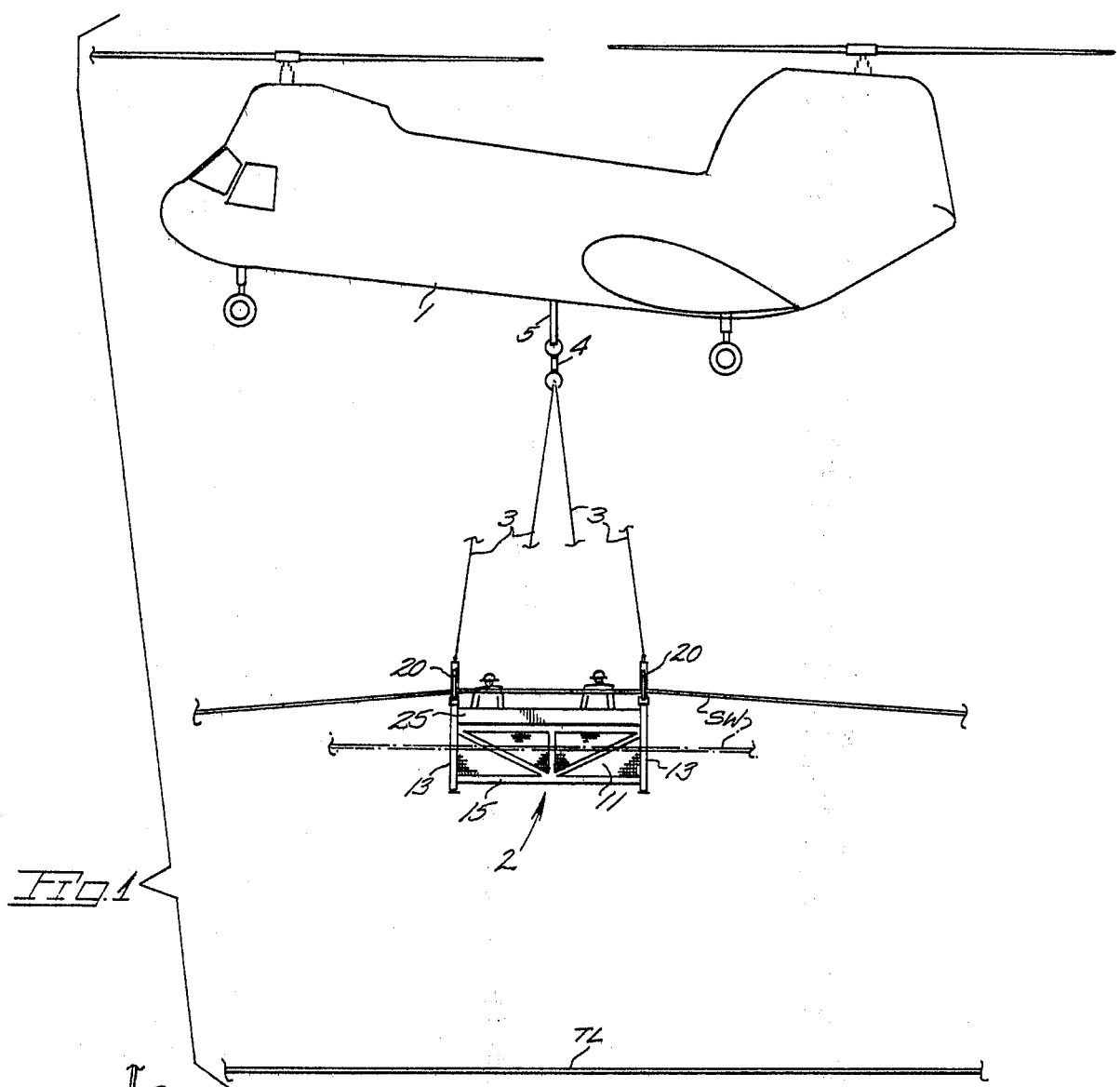
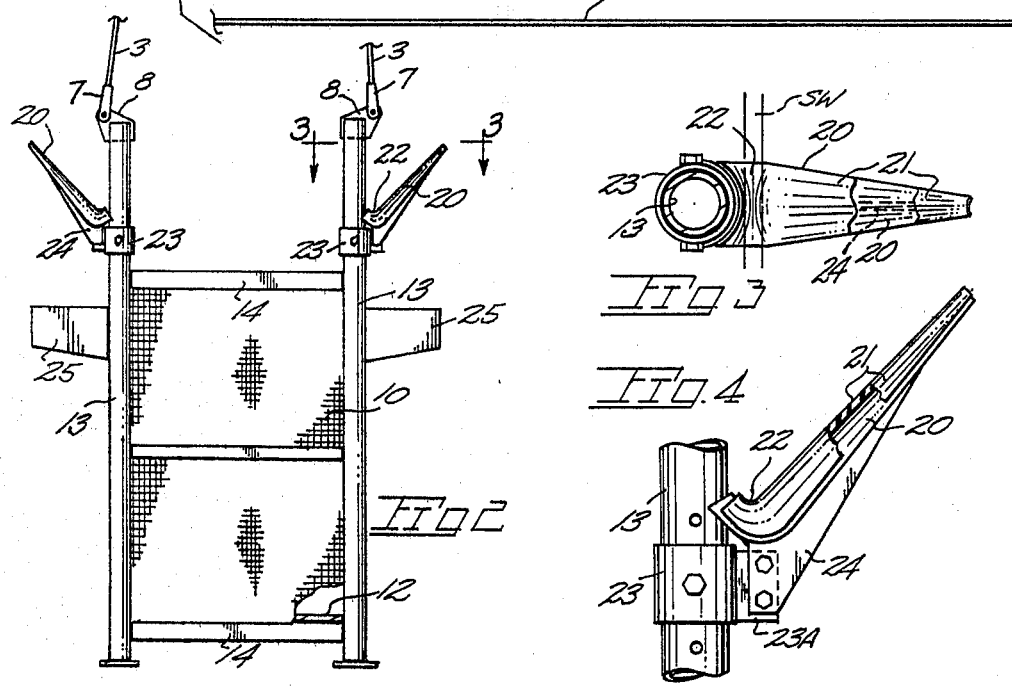

AERIAL BASKET STRUCTURE FOR LINEMEN AND METHOD FOR UTILIZING SAME

BACKGROUND OF THE INVENTION

The present invention concerns an airborne basket structure for workmen for suspension from an elevated support such as a hovering helicopter.

Power transmission lines of the high voltage type transmitting power between power sources and substations are typically supported at intervals by towers spaced along a right-of-way. Also intermediate each of the towers is a static line (or lines) which serves in the general purpose of a lightning rod. Such a static line is spaced several feet above the power transmission line.

Such static lines are spliced at intervals and must be periodically inspected and serviced which constitutes a problem in that such lines are commonly located over cultivated land which results in both land and crop damage when truck supported cranes, etc., are used. The lines often pass over right-of-ways which are subject to environmental restrictions. Further, the use of cranes and the like is inefficient from a time standpoint by reason of the vehicle having to negotiate a wide variety of terrain and indirect routes between work sites. A further drawback to the use of ground supported equipment is the risk of serious injury or death by accidental contact with the high voltage transmission lines located below the static lines. Heretofore, to avoid such risk, the power transmission lines were de-energized at considerable cost and effort. Line location at 100 feet or so above the ground further complicated the use of ground equipment.

In the prior art, to the extent known, U.S. Pat. No. 3,863,736 discloses a workmen supporting scaffold for air-lifting by a helicopter into temporary placement atop a column supporting power transmission and static lines. The airlifted scaffold is suspended below the helicopter and upon lowering of the latter downwardly inclined arms on the scaffold engage column crossarms coming to rest thereon with the scaffold lower portion in abutment with a subjacent portion of the column. Subsequent to platform placement on the column, the scaffold is detached from the helicopter and the helicopter reorientated so as to permit discharge of workmen onto a platform surface. The disclosed scaffold is not intended for nor capable of suitable engagement with a static line nor was such use apparently ever envisioned for same.

SUMMARY OF THE PRESENT INVENTION

The present invention is embodied within an airborne basket type structure particularly adapted for temporary securement to an elevated length of cable enabling servicing of the latter and the method of utilizing same.

The structure includes an enclosure within which workers are at all times safey confined. Extending outwardly from the enclosure are cable engaging means which are configured to retain the enclosure in juxtaposition with that length of cable being serviced. Cable engaging means may be embodied in inclined appendages which, upon contact with an aerial static line or wire, serve to frictionally engage same to the extent that the structure is temporarily joined with that section of the static wire to the extent careful attention may be given to the servicing task at hand, as for example, the reinforcement of end splices between wire ends. The appendages are shown as pairs of inclined arms which jointly engage in pairs the static wire whereupon slight elevation of the structure, imparted by the helicopter, will bias the structure into line engagement.

Important objectives of the present invention include the provision of an aerial structure adapted for engagement with an elevated or suspended cable enabling servicing of the latter without resorting to use of ground vehicles; the provision of such a structure which lends itself to guidance by a helicopter into rapid line engagement without undue maneuvering of the helicopter adding to costly flight time; the provision of a system for servicing aerial lines or cables including a helicopter from which sling lines depend which lines terminate downwardly in securement to an airborne basket structure having frame members from which appendages project for the purpose of static line engagement.

BRIEF DESCRIPTION OF THE DRAWING

In the drawing:

FIG. 1 is a side elevational view of the airborne basket structure operatively supported by a helicopter and engaged with a static line to be services;

FIG. 2 is an enlarged end elevational view typical of both ends of the airbone basket structure;

FIG. 3 is an enlarged horizontal sectional view taken downwardly along line 3—3 of FIG. 2; and FIG. 4 is an elevational view of FIG. 3.

DETAILED DESCRIPTION OF THE PREFERRED EMBODIMENT

With continuing attention to the drawing, a helicopter at 1 constitutes an airborne support for the presently disclosed basket structure indicated generally at 2. Preferably the helicopter is that type powered by two engines or turbines such as the Boeing Vertol helicopter known as the Chinook model with tandem rotors to provide an added multi-engine safety factor as well as stability particularly in crosswind conditions.

Suspension means for structure 2 are shown as four sling or suspension lines as at 3 carried by a swivel arrangement 4. A non-metallic strap at 5 couples the swivel to a safety cable (not shown) which extends about the hook support beam member in the helicopter to, for reasons of safety, provide a redundant attachment jointly with the cargo release hook of the aircraft thereby preventing accidental release in case of an electrical system malfunction. At the lower end of each sling line is provided a cable fitting at 7 for bolted securement to a laterally offset lug 8 on the following described basket structure.

A static wire as at SW extends between widely spaced transmission towers (not shown) while a transmission line is located therebelow at TL. A static wire broken line (lower) position indicates its normal disposition.

The basket structure 2 serves to carry one or more workmen within pairs of upright end and side walls 10 and 11 of expanded metal or the like with one of the end walls being hingedly mounted at one side to provide convenient door entry into the enclosure. A floor at 12 is of a size to preferably support a pair of workers.

The frame of the enclosure includes upright members which may be corner posts at 13 rigidly interconnected by welded end and side crossmembers as at 14 and 15.

In place on each corner post 13, subjacent the upper end thereof, is an appendage in the form of an inclined arm 20 which projects outwardly and upwardly relative to the adjacent side of bracket structure 2. The arms are utilized in paired fashion to frictionally engage the static line or wire SW and retain the enclosure structure in place temporarily thereagainst during line servicing. Contributing to appendage and line engagement is a resilient covering 21 suitably secured in place on the uppermost surface of each appendage or arm 20. Such use of a resilient member, which may be of neoprene rubber, enhances arm-to-line frictional engagement. A crook 22 in each arm ultimately receives a seated line segment. Adjustably mounting the arm to its corner post is a collar 23 with a bracket 23A to which is bolted a gusset 24 welded to the underside of the transversely crowned arm.

Trays at 25 along the enclosure sides conveniently locate lineman tools and parts as a convenient height.

If desired, the enclosure 2 may be additionally secured against any lateral movement along the static line by the use of line clamps one each thethered to each end of the enclosure. Such line clamps are in wide use by those engaged in electrical utility work and require no further elaboration.

The method of using the present aerial basket structure includes the horizontal guidance of the basket by the helicopter so as to effect contact of a pair of basket suspending lines 3 (attached to one side of the enclosure) with the static line whereafter the helicopter climbs a few feet to cause passage of line 3 past the static wire with the pair of basket mounted appendages 20 eventually upwardly engaging the static wire or line at spaced apart points with the wire eventually seating in the crook of each arm of a pair of arms. A slight upwardly directed force is continuously imparted to the basket by the hovering helicopter to assure continued basket-to-static wire engagement while the maintenance task is performed on the static wire. As earlier noted, tethered line clamps at each end of the basket additionally contribute to stabilizing the basket against lateral movement along the static wire.

With reference to FIG. 2, wherein one typical appendage is shown on the side located pairs of appendages, the sling lines 3 are connected in an offset manner by fittings 7 to lugs 8 in a manner permitting unobstructed transition of the fitting and lug past the static wire. Further elevation of the basket structure by the helicopter causes the static wire to be engaged by the pair of appendages on one side of the basket. With the static wire in seated, fixed engagement with the limit stops or crooks of each appendage, the linemen may complete maintenance work on the wire which is at a convenient position.

The present basket enclosure has proved highly satisfactory in the airborne repair of static wire splices occurring at intervals several thousands of feet. Heretofore, such was accomplished by ground equipment or by use of a line supported tram or carriage both of which methods are considered to be more costly by reason of the man hour effort and equipment time incurred.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. An aerial basket structure for linemen and adapted for both transport of the linemen and for temporary engagement with a substantially horizontally suspended wire while the structure is slung below a helicopter, said basket structure comprising, an enclosure within which workers are carried and including upright members to which sling lines depending from the helicopter may be attached, a pair of inclined appendages on at least one side of the enclosure extending outwardly therefrom so as to engage the suspended wire during elevation of the enclosure by the helicopter to thereby engage the enclosure with the suspended wire to enable servicing of the latter by the linemen, said upright members each including a line attachment lug with each lug adapted to receive the lower end of a sling line in a manner to facilitate uninterrupted passage of the basket structure upwardly past the suspended wire prior to engagement of the suspended wire with the appendages.

2. The method of securing a line suspended workmen supporting aerial basket structure temporarily in place on a horizontally disposed elevated line enabling maintenance operations on the latter, said basket structure including inclined appendages on at least one side thereof, the method consisting of the steps of, moving the aerial basket structure in a generally horizontal direction toward the horizontal line to effect engagement of the basket suspending lines with the horizontally disposed line, imparting vertical movement to the basket suspending lines and basket structure whereby the suspension lines slide upwardly past the elevated horizontal line to effect upward engagement of basket structure inclined appendages with the horizontal line, and maintaining vertically directed force on the basket structure to assure frictional engagement of the basket structure appendages with the horizontal line to temporarily secure the basket structure to the line enabling performance of maintenance operations thereon.

* * * * *